INVENTOR
John E. Greenawalt
BY
ATTORNEY

March 30, 1954  J. E. GREENAWALT  2,673,787
METHOD AND APPARATUS FOR RECOVERING CHEMICAL
PRODUCTS FROM WASTE MATERIALS
Filed Jan. 18, 1946  4 Sheets-Sheet 2

INVENTOR
John E. Greenawalt
BY
ATTORNEY

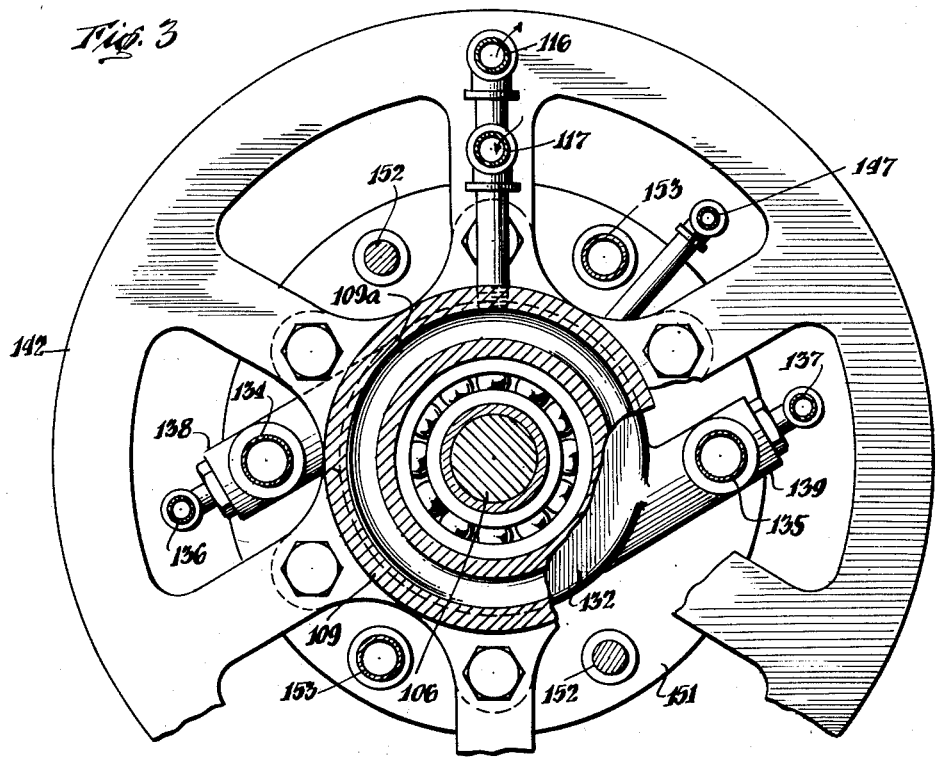
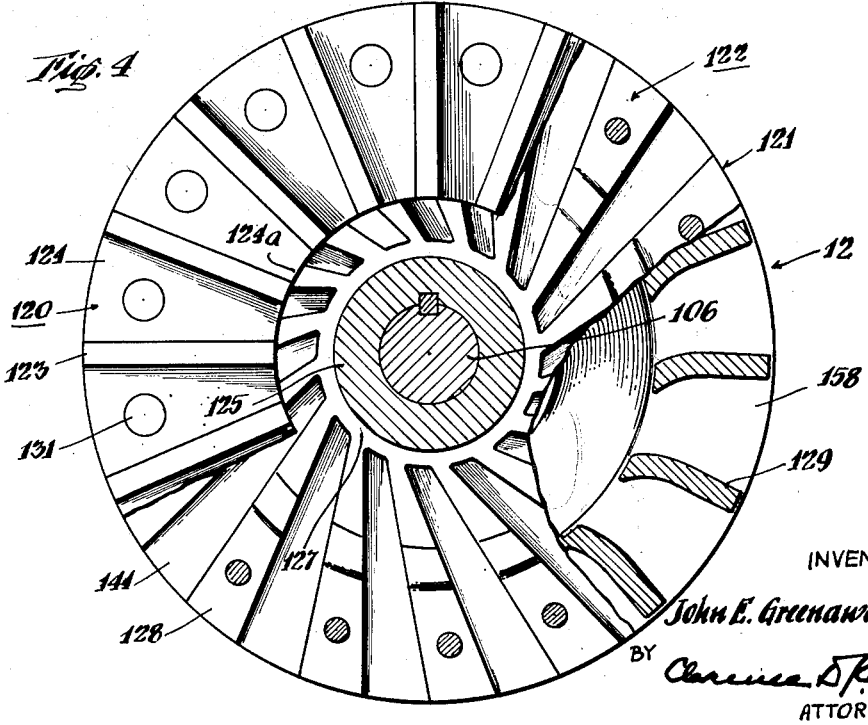

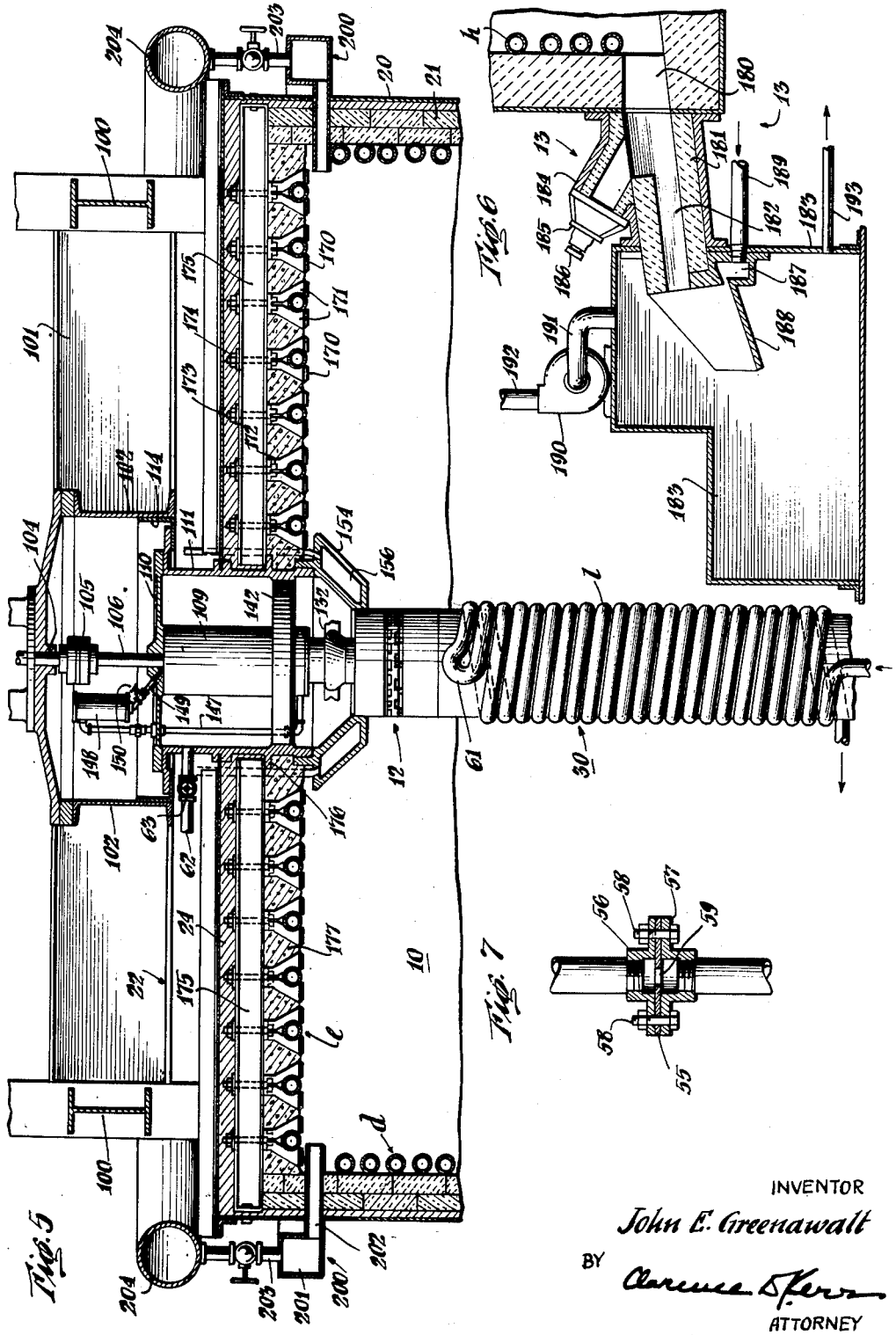

Patented Mar. 30, 1954

2,673,787

UNITED STATES PATENT OFFICE 2,673,787

METHOD AND APPARATUS FOR RECOVERING CHEMICAL PRODUCTS FROM WASTE MATERIALS

John E. Greenawalt, Bronxville, N. Y.

Application January 18, 1946, Serial No. 641,995

21 Claims. (Cl. 23—48)

This invention relates generally to means and method for burning of mixtures containing combustibles and more particularly to furnaces for burning the combustible part of a mixture which contains both combustible and non-combustible constituents.

In the recovery of valuable constituents from a mixture which contains both combustible and non-combustible materials it is frequently desirable to burn the mixture to effect the recovery. It may be desirable to utilize such a mixture merely for its caloric value without particular regard to saving the non-combustible part. For example, it may be desirable to use the heat to generate steam or for other heating purposes. In some instances the non-combustible part may be of sufficient value to warrant its recovery without particular regard to utilization of the combustible part for heating purposes, or in some instances it may be desirable not only to utilize the caloric value of the mixture for heating other things but as well to recover the non-combustible part of the mixture. It is an object of the invention to provide means and method to accomplish such desirable ends.

For example, in the production of paper pulp by the so-called "soda" process there is produced a liquor resulting from the process of cooking the wood with caustic soda. This is commonly known as waste "black liquor." This black liquor when separated from the cellulosic fibres of the wood often contains about 50% of the wood entering the process and this includes the part having very high fuel value. This black liquor also contains valuable soda and the reaction products of the soda. As will be pointed out in further detail hereinafter, this invention lends itself to accomplishing the object of recovering the soda as soda ash from the black liquor while at the same time utilizing the heating value of the liquor. The recovered soda ash may be recausticized for re-use in the pulp digesters.

Accordingly the invention provides a furnace, burner means and a method for burning this black liquor or other mixtures containing both combustible and non-combustible materials in such manner that the non-combustible part is caused to form a layer of the non-combustible material which acts as a refractory upon the interior surfaces of the walls of the furnace and by means and method described in further detail hereinafter this layer may be controlled so that the non-combustible part of the burned mixture may be drawn off from the furnace as a molten mass while controlling the thickness of the layer serving as a refractory on the surface of the walls of the furnace. Moreover the heat from burning the mixture may be put to valuable uses.

Although the invention for purposes of illustration is hereinafter described in connection with the recovery of soda from waste black liquor, it will be apparent as the description proceeds that the means and method provided by the invention are capable of different and varied applications. For example, pulverized coal may be burned in a manner whereby the non-combustible part may be caused to form a slag-like crust of material upon the walls of the furnace to act as a refractory, while the amount of slag-like material in excess of that desired as a refractory layer may be drawn off from the furnace as a molten mass. At the same time, the heat from the burning of the coal may be put to valuable use.

Also, the invention is adapted for use in metallurgical operations for the smelting of ores. For example, ores containing sulphides or other combustible in which the combustion of the sulphur or other combustible and the oxidation of the metals produce sufficient heat to convert the non-combustible part of the charge to a molten condition. In such operations the slag-like part may be caused to form a layer of controllable thickness on the interior surfaces of walls of the furnace to act as a refractory while excess molten slag may be drawn off from the furnace.

To accomplish these desirable objects and others which will become apparent from the following description, the invention comprehends a furnace the inside of which is provided with water-cooled means for maintaining the temperature of the surfaces of its walls relatively low, a burner for burning the charged mixture in a particular manner whereby the flame produced may be controlled and the non-combustible part of the mixture is caused to coalesce upon the cooled interior surfaces of the furnace to form a layer or crust of this material on said surfaces to act as a refractory. Excess coalesced non-combustible materials may, by reason of the controlled temperature of the interior surfaces of the furnace, be caused to flow down over the surface of the so-formed crust and be withdrawn from the furnace. And such hot combustion gases as are produced by burning of the mixture may be utilized for generating steam or, if desired, for heating other things, such, for example, as evaporators, boilers, or for other purposes where hot combustion gases may be used.

Although the invention lends itself admirably to various modifications which will be governed largely by the particular end to be accomplished, in accordance with one embodiment of the invention a furnace with a vertically disposed generally cylindrical side wall, top wall and sloping bottom wall is provided thus to form a combustion chamber. The roof of the furnace has a flat spiral coil suspended from beams supported in the top of the furnace and above this coil is a layer of refractory material. The floor of the furnace also includes flat spiral coil resting upon a layer of refractory material. The cylindrical side wall also is provided with a coil or series of coils lying adjacent a cylindrical refractory wall. All of these things preferably are encased in a steel shell. A wheel burner having a vane type rotor is mounted from above the roof and extends into the combustion chamber of the furnace. A center post is provided with a water-cooled coil around its exterior surface. This center post serves as a means to support a water jacket for preventing overheating of the burner wheel and it also provides means for introducing air to the burner. The flue of the furnace also is provided with a water-cooled coil on its interior surface. The various coils are connected to a pump for forced circulation of water through them; orifices being provided in the separate coils to regulate and control the amount of water circulated through them, thus to provide a means for control of the various parts of the interior surface of the furnace. The heat transferred to the water circulating in the coils generates steam which may be directed to such purposes as desired and the hot combustion gases passing from the flue of the furnace may be directed to heat a boiler for generating steam or for other heating purposes.

In the operation of the furnace the charge containing both combustible and non-combustible parts is fed through the vane type rotating wheel burner together with primary air, secondary air as desired being caused to flow through the wheel burner impeller vanes. Tuyères are also provided to provide additional air as described hereinafter. The material is burned in the combustion chamber and the non-combustible part is thrown by centrifugal force against the interior surfaces of the furnace and otherwise collects and coalesces on the cooled surfaces. The temperature of the interior surface is so adjusted that the non-combustible material collects and solidifies in a layer on the surfaces to form a refractory. The operation is controlled so that after a substantially solid crust or layer of desired thickness is formed, additional material coalescing on the crust runs down to the bottom and may be drawn off as a molten mass through a draw-off spout provided for that purpose. Heat generated from the burning material is transferred to the water circulating in the coils and the circulating heated water and steam thus formed is delivered to a separator from which the steam may be passed into steam lines for such purpose as desired and the separated hot water together with make-up water is recirculated through the coils in the furnace. The hot combustion gases are passed through the flue of the furnace and these hot gases may be utilized as desired. One application is to connect the furnace with a boiler to utilize the hot combustion gases passing through the flue for steam generation although other uses will suggest themselves.

Although the novel features which are believed to be characteristic of the invention will be pointed out in the annexed claims, the invention itself as to its objects and advantages and the manner in which it may be carried out may be better understood by reference to the following description taken in connection with the accompanying drawings forming a part thereof, in which:

Fig. 3 is a view on line 3—3 of Fig. 2, certain parts being broken away;

Fig. 4 is a top view of the burner wheel with parts broken away to illustrate the construction of the impeller vanes;

Fig. 5 is a section view of the top part and roof of the furnace illustrated in Fig. 1 and showing also the center post and its associated coil;

Fig. 6 is a section view to larger scale of the draw-off spout of the furnace illustrated in Fig. 1; and Fig. 7 is a view of an orifice plate to illustrate one manner of adjusting the flow of cooling liquid through the coils in the furnace.

Figure 1:
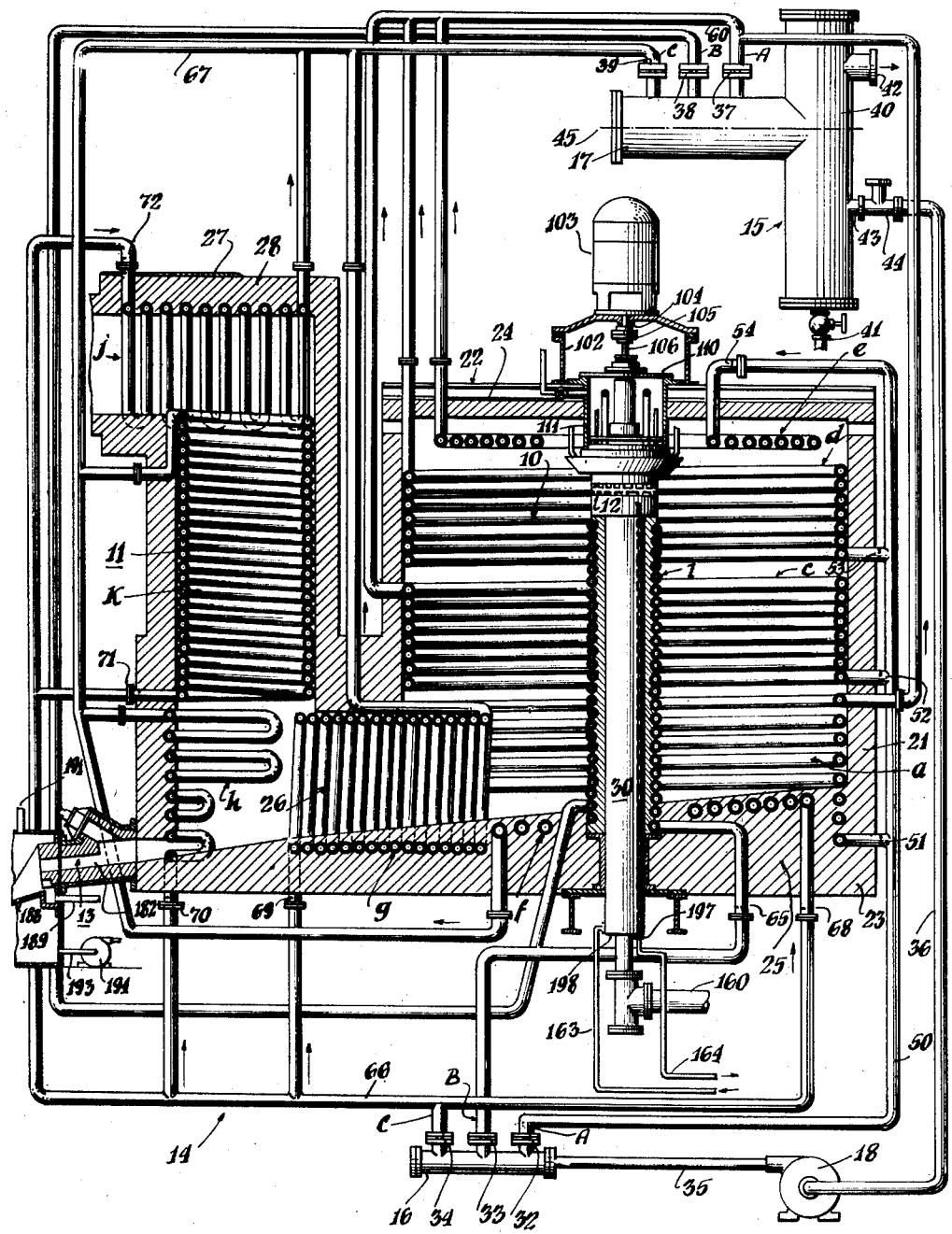
Fig. 1 is a section view in elevation of a furnace embodying the invention; this view being largely diagrammatic for convenience in illustrating various features of the invention.

In the following description reference is made to the drawings in which like reference characters indicate corresponding parts in the different views. Referring at the outset to Fig. 1 which for illustrative purposes is largely diagrammatic, it will be observed that the embodiment there shown comprises in general, a combustion chamber 10, a flue 11, a burner 12, a draw-off spout 13, a system of conduits 14 connected to a separator 15 through headers 16 and 17; the circulating system being provided with a pump 18 for forced circulation of water through the passageways or conduits in the system.

The furnace comprises a cylindrical steel shell 20, against which lies firebrick 21 or other suitable refractory construction material, a roof 22 and a sloping bottom 23, also provided with firebrick or other refractory 24 and 25. Extending from the combustion chamber 10 near the bottom is a furnace outlet to the flue 11 which likewise is circular in cross-section. The outlet and flue comprises a steel shell 27 lined with firebrick 28 or it may be lined with other refractory material.

Extending upwardly from the bottom of the furnace is a post 30 the purpose of which is described in further detail hereinafter. The burner 12 also described hereinafter is suspended from the roof 22 and extends into the combustion chamber 10.

The interior surfaces of the combustion chamber 10, the flue 11 including the furnace outlet 26, and the exterior surface of post 30 are provided with a system of coils providing passageways for the circulation of water therethrough. These coils, as shown are connected in three main circuits A, B and C. Each of the main circuits comprises a group of coils as hereinafter described.

The main circuits A, B, C, at their head ends are connected to the manifold or header 16 at 32, 33 and 34 respectively; this header being connected to the discharge pipe 35 of the circulating pump 18. This pump, shown as a centrifugal or rotary type, is driven by a suitable prime mover, such as an electric motor (not shown), and it may be noted this pump is located at an elevation below the coils and separator 15 to insure a head of water to the suction side of the pump through the pipe 36 from the separator.

The discharge ends of the main circuits A, B and C are connected to the manifold or header 17 at 37, 38 and 39 respectively. This manifold 17 constitutes a part of the separator 15 which comprises the header and a closed vertically disposed steel cylinder 40, which is provided with a blow-off connection 41, a steam take-off connection 42 and a water-take-off connection 43 which connects to the suction side of pump 18 through pipe 36. The T 44 connected to the water take-off provides a means for charging make-up water to the water circulating system to compensate for steam generated in the system and taken off through the steam discharge or take-off 42. With reference to the separator 15 it will be apparent from the description that if a mixture of water and steam is charged into the separator, the water will settle to the bottom and may be drawn off through pipe 36, whereas the steam above the water level (indicated by dot-dash line 45) may be discharged through discharge connection 42 which in turn may be connected to a steam line. The steam may be utilized for such purposes as desired. It may be noted here also that the closed circulation system of coils and separator are constructed of materials to withstand relatively high pressures, and welded or high pressure flanged joints are recommended.

Main circuit A comprises the lower furnace wall coil $a$, intermediate furnace wall coil $c$, upper furnace wall coil $d$, and roof coil $e$, the head ends of which are connected to a distributor pipe 50 connected to the header 16 at 32. Each of these coils is provided with a connection to accommodate an orifice for regulating the proportionate amount of water circulating through them, such orifices being indicated at 51, 52, 53 and 54. Orifice plates such as illustrated in Fig. 7 at 55 may be used or such other means as may be suitable for adjusting or regulating flow of water through the coils may be used. In Fig. 7 the orifice plate 55 having an orifice 59 is shown clamped between flanges 56 and 57. The orifices may be removed and replaced by loosening the flange bolts 58. The discharge ends of these coils $a$, $c$, $d$ and $e$ are connected to a collector pipe 60 which is connected to the header 17 at 37. The proportionate amount of water forced through main circuit A may be regulated by an orifice located at connection 32 at header 16 or by such other regulating means as may be suitable.

Main circuit B comprises the coil $l$, the head end of which is connected to header 16 by a connection at 33 and the tail end is connected to the header 17 of the separator by a connection at 38. It may be noted that this coil extends around the exterior of center post 30 (described hereinafter). This coil is in the form of a "double coil"; that is, the coil spirals go up to the top and terminate in a return bend 61 and the spirals then come down between the spirals going up, as shown more clearly in Fig. 5. This coil is provided with a regulating orifice as indicated at 65 and also provision is made for a flow regulating orifice at connection 33.

Main circuit C comprises coils $f$, $g$, $h$, $k$ and $j$. The head ends of these coils are connected to distributor pipe 66 and the tail ends are connected to collector pipe 67. Pipe 66 connects with header 16 through a connection 34 which may also be provided with a flow regulating orifice. Pipe 67 connects to header 17 of the separator 15 through a connection 39. Coil $g$ is a spiral coil lying at the interior surface of the furnace outlet. It should be especially noted this coil extends a substantial distance into the interior of combustion chamber 10; the lower combustion chamber coil $a$ being designed with return bends rather than extending spirally all the way around the circumference of the combustion chamber, thus to make room to accommodate the inwardly extending flue coil $g$. Also, the coil $h$ is formed so as to lie adjacent the interior surface of the flue. Coil $k$ is a spiral coil to lie adjacent the interior surface of the upwardly extending part of the flue and coil $j$ is designed to lie adjacent the interior surface of the horizontally extending part of the flue. Coil $f$ is a flat spiral designed to lie over the bottom of the combustion chamber. Each of coils $f$, $g$, $h$, $j$ and $k$ are provided with connections to accommodate flow regulating orifices as indicated at 68, 69, 70, 71 and 72 and as well the connection of the main circuit C to the header is provided with a regulating orifice at 34.

From the foregoing it will be seen that there is provided a combustion chamber defined by a cylindrical wall, a roof and bottom, and these interior surfaces are provided with coils providing passageways for circulation of water. Also the flue from the combustion chamber is provided with coils providing passageways for circulation of water adjacent its interior surface. Likewise, the exterior surface of the hollow center post is provided with a water coil. Each coil is provided with flow regulating means. Consequently there is provision for control of temperature of the interior surface of the combustion chamber and flue by forcing a coolant, such as water, through the various coils.

It will be understood also that a plant constructed in accordance with the invention will be provided with the usual valves, flow meters, gauges and other fittings and equipment customarily used in construction work. It is deemed superfluous to illustrate these in detail in the drawings as this seems unnecessary for an understanding of the invention and its principles of operation.

The burner arrangement for feeding and atomizing the charge to be burned in the combustion chamber comprises, in general, a motor driven vane wheel or rotor, means for supplying the charge to the rotating wheel, means for supplying air, means for lubrication and means for preventing overheating of the burner parts which extend into the combustion chamber.

Referring more particularly to Figs. 1 and 5 it will be seen that the burner is supported on the roof 22 of the furnace. Structural members for carrying the weight are provided; such as, I-beams 100, 101 and channels 102 to form a suitable supporting frame. An electric motor 103 supported on the frame has its downwardly extending drive shaft 104 connected by a drive coupling 105 to the burner shaft 106.

Figure 2:
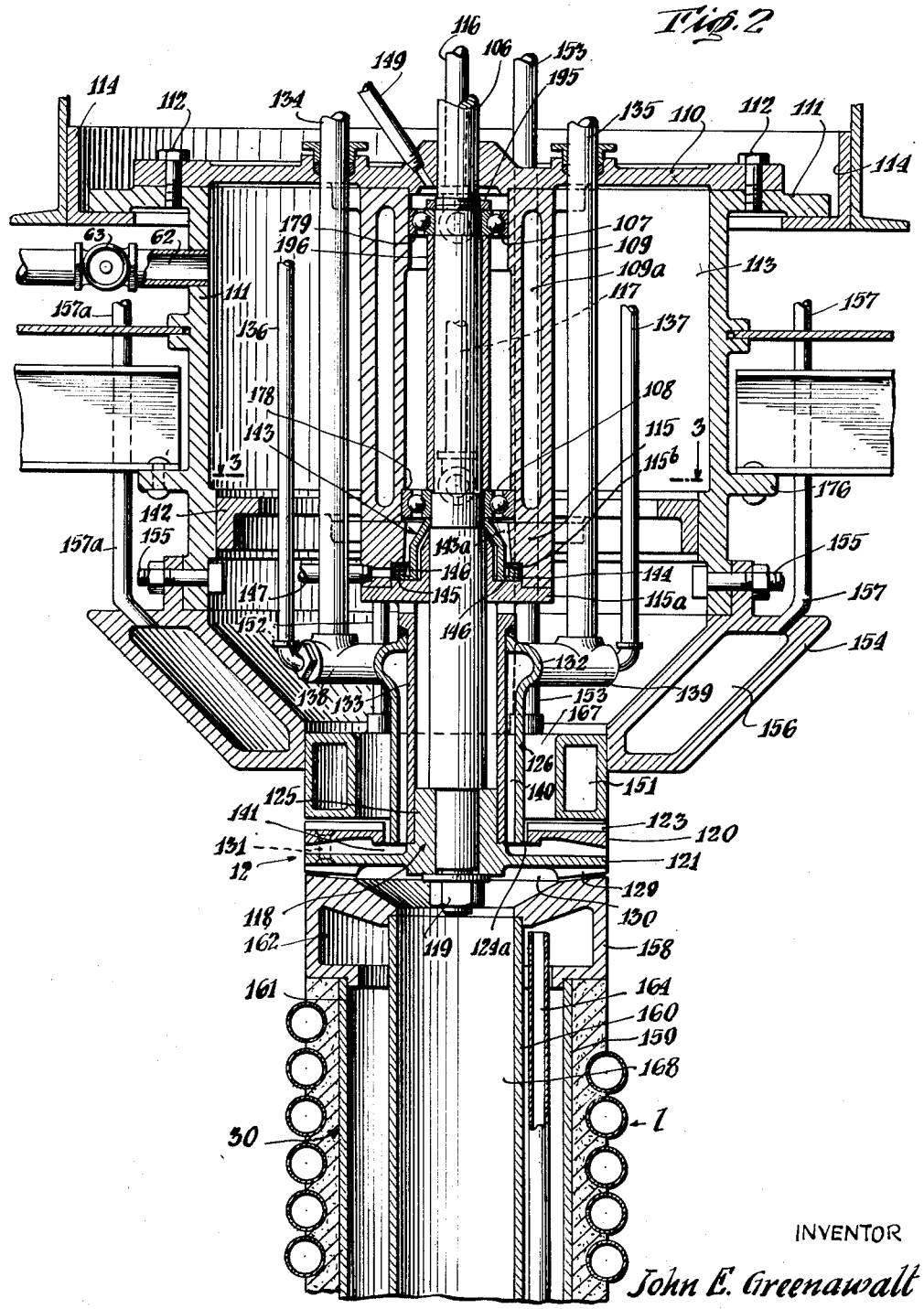
Fig. 2 is a section view in elevation of the burner and associated parts, certain parts, however, being broken away so as not to crowd the drawing.

Details of the burner and associated parts are more clearly shown in Fig. 2 which is a cross-section through the burner and associated parts. The shaft 106 which is driven by the motor 103 is mounted to rotate in ball bearings 107 and 108 which in turn are mounted in a hollow cast column 109. This casting is secured to the top plate 110. The top plate is bolted to the annular casting 111 by means of bolts 112. As will appear later in the description, the burner may be removed from the combustion chamber out of the well 113 provided by the annular casting 111. This casting is carried securely on suitable supports on the roof, such as, angle irons 114. The hollow column casting 109 is provided with an annular chamber 109a for the circulation therethrough of cooling water. Pipes 116 and 117 connecting to this water jacket chamber 109a may extend through the top plate 110 for connection to a suitable source of circulating water separate from the furnace coil system described above. The casting 109 carries at its bottom an annular casting 115 to which is secured a flanged ring 115a in which the shaft 106 rotates. Castings 115 and 115a are made separate for convenience of assembly and are secured together by bolts (not shown). The annular ring 115 may also be bolted to the casting 109. It will be noted that the upwardly extending hub portion 115b of the casting 115a and the hollow casting 115 provides an annular space or well to accommodate an impeller 143 secured to shaft 106 and described hereinafter.

Secured to the lower end of the drive shaft 106, to rotate therewith, is an atomizing wheel or rotor 118. This may be keyed to the shaft and securely fixed thereto as by a nut 119. The details of this atomizing wheel or rotor may be better understood by reference to Fig. 4 in connection with Fig. 2. It comprises a top plate 120 and a bottom or main plate 121. The top plate comprises a substantially flat disk having radially disposed vanes 123 which extend upwardly from the surface 124 of the disk 120. This top plate or disk terminates in a circle short of the hub 125 of the atomizing wheel, thus providing a central opening 124a. This leaves an annular space between the inner ends of the vanes 123 and the outside of the hub 125 to accommodate the annular distributor 126 (later to be described). The main plate 121 of the atomizing wheel includes a ring 127 from which extends spokes or vanes 128. The main plate 121 is fixed to the hub 125 and also has radially disposed depending vanes 129. These vanes 129 terminate short of the hub 125 of the wheel to provide an annular space 130 (see Fig. 2). When the plates are secured together as by bolts or rivets 131, as indicated in Figs. 2 and 4, it will be seen that the upper plate provides an air impeller, the main plate provides an impeller to receive the charge from the annular distributor 126. Also, the depending vanes 129 of the main plate 121 provide an impeller for air which may be introduced from the bottom of the furnace through the center post 30 (later to be described). It will be noted that the channels 141 defined by the upper plate 120, the main plate 121 and the vanes 128 of the main plate extend inwardly to connect with the central opening 124a provided by the upper plate 120.

The annular distributor 126 is made up of a special casting 132 which fits on and is secured to a sleeve 133. The casting 132 is shaped as indicated in Figs. 2 and 3 to receive pipes 134 and 135 which extend through the top plate 110. These pipes 134 and 135 are connected at the outside with a source of black liquor to be burned. These pipes 134 and 135 may be designated as the fuel-charging conduits. Also connected to the interior of the distributor casting 132 are pipes 136 and 137 which also extend through the top plate 110. These pipes are connected on the outside to a source of air, preferably under pressure. Thus it will be seen that provision is made to charge black liquor, or such other mixture as may be burned, together with primary atomizing air into the distributor 132. The hollow extensions 138 and 139 (see Fig. 3) of the distributor are tangentially disposed so that the mixture of fuel forced through pipes 134 and 135 and primary air forced through pipes 136 and 137 is given a swirling motion around the annular channel 140 of the distributor and ultimately passes downwardly through this feed channel to the distributor wheel 118. Particular attention is directed to the manner in which the lower end of the distributor extends into the central opening 124a of the atomizing wheel 118. The fit is a close machine fit and fuel and primary air enters the wheel between the upper plate 120 and the main plate 121 into the channels 141 and is forcibly thrown out tangentially from the wheel by centrifugal force set up by the rotation of the atomizing wheel. The primary air forced through pipes 136 and 137 also intensifies the atomizing effect of the wheel and thereby greatly intensifying the combustion in the furnace.

To insure against lateral movement of the burner mechanism a spider ring 142 fits with a machine fit into the annular well provided by the annular casting 111. This spider ring may be cast as an integral part of the casting 109 or it may be a separate part secured to casting 109 by bolts. Bearings 107 and 108 are mounted to provide for expansion of the shaft 106. The outer race of bearing 108 is held in a groove 178 in the bore of the casting 109 and the inner race fits on the shaft. Thus this bearing 108 is prevented from vertical movement. The upper bearing, however, is free to move vertically with longitudinal expansion or contraction of the shaft 106. The outer race 179 of this bearing 107 is slidably fitted in the bore of the casting 109 and the inner race is fitted on the shaft. A sleeve 196 within which the shaft rotates maintains the two bearings 107 and 108 in spaced relationship; a nut 195 on the shaft holds the bearing against this sleeve 196.

Special provision is made for lubricating the bearings 107 and 108. Mounted on the shaft 106 to rotate therewith is an impeller 143 having a horizontally extending annular flange portion 144. A plurality of radially extending bores 145 which connect with an annular groove 146 provides a passageway from the well 143a provided by the hollow casting 109 to an oil-circulating conduit 147 which extends upwardly through the top plate 110 and connects with an oil reservoir 148 above the top plate (see Fig. 5). A pipe 149 connects this reservoir with the interior or bore of the hollow column 109. A valve 150 in the pipe 149 may be used to regulate the supply of lubricating oil to the bearings 107 and 108. When the burner is in operation lubricating oil is dripped from the reservoir 148 through the pipe 149 and maintains the bearings well lubricated, excess oil finding its way by gravity to the bottom of the well 143a where it comes in contact with the rotating impeller 143. The oil in this well enters the annular groove 146 and from there is forced by centrifugal force out through the radial bores 145 to the pipe 147 through which it is returned to the reservoir 148. Thus the burner provides its own lubricating oil circulation system.

Also carried and supported by the top plate 110 and spider ring 142 is an annular water jacket 151 which is located just above the atomizing wheel 118. This water jacket casting is carried on hanger rods 152 which extend upwardly through the spider wheel 142 to be supported by the top plate 110 (only one being shown in Fig. 2). To circulate cooling water through this water jacket a charging pipe 153 extending through the top plate 110 and connecting to the interior of the water jacket is provided. A similar discharge pipe (not shown in Fig. 2) is provided. These pipes connecting with the water jacket 151 may be connected from the outside of the furnace to a suitable source of cooling water.

It may be noted here that the burner and its associated parts as just described including the atomizing wheel 118, water jacket 151, distributor 132, spider ring 142 and the other parts connected through the top plate 110 may be removed as an assembly or unit from the furnace. The entire assembly is carried by the top plate; hence the entire assembly may be taken out of the furnace from above by removing the bolts 112 which secure the top plate to the casting 111.

This casting 111 not only provides a housed well 113 within which to mount the burner wheel and its associated parts but it also provides a means for supporting an annular casting 154 which forms a water jacket to protect the burner mechanism from overheating. This casting 154 is supported by bolts 155. It has a hollow annular chamber 156 and cooling water may be circulated through it through pipes 157 and 157a extending through the roof of the furnace (see Fig. 2). It will also be noted that a pipe 62, having a valve 63, connects to the interior of the casting 111. The pipe 62 is connected preferably to a source of air under pressure.

In addition to the means for maintaining the upper part of the wheel and the burner mechanism from becoming overheated, a water jacket is provided to prevent the lower part of the atomizing wheel from becoming overheated. This arrangement comprises an annular water jacket casting 158 resting upon a center post 30. The center post comprises an outside steel pipe 159 and a concentrically positioned inside pipe 160, thus providing an annular space or channel 161 which connects with the interior annular space 162 of casting 158. Cooling water may be introduced through a pipe 163 (see Figs. 1 and 2) into the annular space 161 and circulated therethrough including the casting 158, and may be discharged through a pipe 164 extending down through the annular space 151 and to the outside through a stuffing gland 197 in the ring 198 which closes the lower end of the annular channel 161. The interior 168 of pipe 160, which extends to the outside, is connected with a suitable source of air, preferably under pressure. And, as noted, it connects with the annular space 130 (see Fig. 2) in the lower plate of the burner wheel 118. Consequently the center post 30 provides a means for cooling the burner wheel and at the same time a means for supplying secondary air to the inside of this wheel. As mentioned hereinbefore the cooling coil 1 (see Figs. 1, 2 and 5) provides means for protecting the center post from the intense heat developed in the combustion chamber when the furnace is in operation.

Special attention is also directed to the manner of mounting the spiral coil e to the roof of the furnace. The mounting of the coil is more clearly shown in Fig. 5. The coil is provided with a plurality of cast iron blocks or lugs 170 which are clamped to the coil. These lugs, if desired, may be welded or otherwise suitably secured to the coil. As shown, the lugs are Y-shaped, the arms 171 extending around the circumference of the pipe making up the coil and the stem 172 extending upwardly. Bolts 173 are secured to the stems 172. These bolts may then be secured as by means of nuts 174 to I-beams 175. The I-beams 175 are supported at their inner ends upon an annular shoulder 176 of the casting 111 and they may be secured at their outer ends to the steel shell and may rest upon the brickwork 21. A sufficient number of these radially extending I-beams 175 and a suitable number of lugs are provided to afford ample support for the suspended coil e. The coil and lugs may be embedded in refractory cement 177 to afford better protection of the I-beams from the heat developed in the combustion chamber 10.

The draw-off spout illustrated in Fig. 1 and shown in larger scale in Fig. 6 comprises an arrangement for drawing off molten products formed in the furnace. This arrangement comprises a taphole 180 in the wall of the furnace at the lowermost section of the sloping bottom of the furnace. The taphole 180 is connected to a hollow spout lined with firebrick or other refractory 181 which provides a tunnel 182 into the interior of a closed tank 183. An inspection tube 184 connects with the tunnel 182 and is provided with a removable cover 185 which may be provided with a closed peephole 186. The cover is made removable so that a suitable tool may be inserted into the tunnel for clearing it should it become plugged. At the outside end of the tunnel 182 and within the tank 183 there is provided a channel 187 and a splash apron 188. A pipe 189 connected to a suitable source of water connects with the channel 187. When burning black liquor, for example, molten sodium carbonate or other molten products will gravitate through the taphole 180 and tunnel 182 and drop upon the stream of water flowing over the splash apron 188. Water will be forced through pipe 189 into the channel 187 and flow over the apron 188, and the hot molten sodium carbonate will here come in contact with the water. To insure against freezing of the molten sodium carbonate in the tunnel 182 the covered tank 183 is provided with an exhaust fan 190 driven by a suitable prime mover (not shown). The suction side of the fan is connected by a pipe 191 to the interior of tank 183 and the discharge side is connected to a pipe 192 which may connect to the flue 11 (shown in Fig. 1). This fan serves a multifold purpose. It draws some of the hot combustion gases from the flue 11 to keep the molten soda hot as it flows through the tunnel 182 and such steam or other vapors as are produced by reason of the hot molten soda products coming in contact with cooling water on the splash plate 188 are exhausted from the tank 183. The exhausted vapors and gases may be returned to the discharge end of the flue or they may be sent to a scrubber system or otherwise handled.

Inasmuch as the soda products are water soluble the water solution formed in tank 183 may be drawn off through pipe 193. This solution contains the recovered soda products and may be directed to such places as desired for further use or re-use. If it is desired to re-use the soda in the digesters of a paper mill the soda which is recovered as soda ash (sodium carbonate) may be recausticized to convert it to caustic soda (sodium hydroxide).

The furnace is also provided with a plurality of tuyères 200. These may be circumferentially spaced about the furnace beneath but adjacent to the coil e in the roof of the furnace. The tuyères comprise a chamber 201 connected to a conduit 202 extending from the side wall of the furnace so as to direct air or such other gases or mixtures as may be introduced through the tuyères in a substantially horizontal direction under the roof or arch of the furnace. Additional air (herein referred to, for convenience of description, as "tertiary air") may be introduced through these tuyères and form a layer of air gradually descending in the chamber and into which is projected the fuel from the rotating burner wheel 118. Connection to the tuyère chambers 201 is made through a pipe and valve 203 to a header 204. In some applications of the invention it may be desirable to operate the furnace as a reducing furnace. That is, it may be desirable to burn certain materials in a reducing atmosphere. The tuyères are advantageous in effectively accomplishing this end as materials having a reducing reaction may, if desired, be introduced through the tuyères.

For purposes of illustrating the manner of practising the method of the invention, the operation of the furnace is, for convenience, described in connection with the recovery of soda from waste black liquor from the soda process. It will become apparent from the description, however, that the invention lends itself to other and varied practical uses.

The black liquor as it is drawn off from the digesters in the production of paper pulp by the "soda" process ordinarily is too diluted for burning it directly in an advantageous manner. Consequently the waste black liquor is treated to drive off some of its water content. For efficient burning the black liquor may be concentrated to have a specific gravity of 32° Baumé to 37° Baumé at 60° F. After the furnace is "warmed up" or brought up to temperature, by first burning a suitable fuel oil, the concentrated liquor which may be, for convenience, called the "fuel" is then introduced into the burner through fuel pipes 134 and 135; it being understood the burner wheel is rotated by the motor 103. Assuming a burner wheel of 18" in diameter the rotational speed of the wheel will be adjusted so as to insure proper burning of the fuel in the combustion chamber. In some instances this speed will be in the neighborhood of 3600 R. P. M. While the fuel is introduced through the pipes 134 and 135, air under pressure from a suitable source is also introduced through pipes 136 and 137. The fuel and air mixture entering the distributor 132 is given a swirling motion and passes downwardly through the annular passageway 166 into the channels 141 intermediate the plates 120 and 121 of the burner wheel 118. Meanwhile secondary air is drawn through pipe 62 into the well 113 of the casting 111, thence through the annular space 167 between the distributor and the water jacket casting 151, to the vanes 123 of the top plate 120 of the burner wheel. This secondary air is thrown out in a flat disk-like layer. In the meantime air is forced or drawn through the hollow center post through the interior 168 of pipe 160 into the annular space 130 of the lower plate 121 of the burner wheel; the vanes 129 throw out this air in a flat disk-like layer. Consequently there are three layers being thrown centrifugally from the wheel, namely, an intermediate layer of atomized fuel and primary air from channels 141 and a layer of secondary air from vanes 123 above the fuel layer and a layer of secondary air from vanes 129 below the fuel layer. The various amounts are regulated so as to provide a flame front which is concentric with the rotating wheel and a substantial distance from the circumference of the burner wheel and the combustible part of the black liquor is burned in a concentric ring in the combustion chamber. In some instances additional air (herein referred to for convenience of description as "tertiary air") may be introduced through the tuyères 200 to effect the desired conditions in the furnace. The burning is completed before the burnable products reach the side walls of the furnace. The non-combustible part of the fuel comprising the soda is thrown by centrifugal force in such manner that a substantial part of it comes in contact with the interior surfaces of the combustion chamber. As mentioned hereinbefore, cooling water is circulated by pump 13 in regulated amounts through the various coils A, B and C within the furnace and flue and the temperature of the surface is so adjusted by means of the circulating water that the soda products coalesce upon the interior coils or interior surfaces of the furnace. The temperature is so adjusted that a substantially solid layer or slag-like crust of soda forms upon the interior surface. This crust or layer of slag-like material serves as a refractory. This layer may be built up from ¼" to as much as 1" in thickness. The thickness is largely dependent upon the temperature at which the furnace is operated and the temperature of the water in the coils.

As the operation proceeds and more fuel is burned, additional quantities of soda products come in contact with the deposited layer of slag-like refractory and the temperature of the walls is so adjusted as to carry away sufficient heat from the additional soda introduced with the fuel into the furnace to permit these additional amounts of soda to coalesce but remain molten while at the same time maintaining a substantially solid layer of the slag-like material on the surfaces of the furnace. The additional soda which is coalesced and maintained molten will then gravitate down the side walls of the furnace and the center post to the bottom where likewise the temperature is controlled to maintain a crust adjacent the cooling coils.

In the operation of the furnace such soda in the form of vapor which is not coalesced on the side walls of the combustion chamber will largely come in contact with the cooled surfaces of the furnace outlet 26 and the flue 11 and such soda vapors or products as come in contact with these cooled surfaces will be caused to coalesce and solidify to form a refractory layer and the thickness of the layer on the walls of the outlet and flue may be controlled by controlling the temperature of the interior surfaces as described above. The hot combustion gases leaving the flue will be largely stripped of their soda content and these hot combustion gases may be directed for heating other things. For example, the furnace may be connected to a steam boiler, in which case the flue 11 will be connected to the boiler housing in the usual manner of connecting furnaces to heat a steam boiler. In some instances, the gases after having had their useful heat removed therefrom may be passed through a system of scrubbers for removing the last traces of soda if such practice is desired.

Inasmuch as the system of cooling coils is a closed circulating system, the heat transferred to the circulating water generates large quantities of steam. As an indication of the temperatures involved, it may be here pointed out that sodium carbonate melts at 1650° F. so that sufficient heat must be carried off by the circulating water to maintain the surfaces where the crust or layer of sodium carbonate is formed at a temperature below the melting point of sodium carbonate.

As the water circulating in the coils takes up the heat from the furnace, steam is generated in the circulating water which is passed into the separator 15 where the steam is separated from the water remaining in liquid form. This steam may be taken off at the take-off connection 42 of the separator and passed into the regular steam lines of the pulp plant or may be used for such other purposes as may be desired; for example, in evaporators for concentrating the diluted black liquor. Make-up water to compensate for the steam drawn off from the separator is added to the circulatory system through a connection to T 44 of the separator.

The water jackets 109, 151, 156 and 158 are made of castings and therefore it is impractical to attempt to maintain high pressures within them. Accordingly such water as may be heated by circulating through these jackets can not, as a practical matter, be connected to the high pressure coil system. However, water circulating through these castings is heated and may be put to practical use. It may, for example, be used as boiler feed water or for other similar purposes. On the other hand, the system of coils A, B and C in the furnace together with the separator 15 may be made of materials to withstand high pressures. Accordingly, steam under high pressure is generated in the coil system.

As mentioned above, molten soda gravitates to the bottom of the furnace and may be flowed off through taphole 180 through the tunnel 182. The exhaust fan 199 maintains a suction on the closed soda solution tank 183, drawing hot gases from the furnace to maintain the tunnel hot whereby to keep the soda in molten flowable condition. In the meantime, water or weak soda solution from a suitable source is forced through the pipe 189 into channel 187 from which it flows over splash plate 188. The hot molten soda coming in contact with the water will form steam and vapors which are also drawn off by the exhaust fan 190. The vapors and gases are forced by the exhaust fan to the outlet of the flue 11 or to a scrubber system if desired. The aqueous solution of soda formed in tank 183 may be drawn off through pipe 193 by a pump 194 and then recausticized for subsequent use in the pulp wood digesters or for such other uses as desired.

It should be noted also that the black liquor from the so-called soda process is the residual liquor resulting from the use of caustic soda. However, the soda is recovered from the furnace as soda ash (sodium carbonate). Hence the furnace conditions are regulated to cause the formation of sodium carbonate in the burning process. In other instances, for example, in black liquor from the "sulphate" process it is desirable to recover the soda from the black liquor as sodium sulphide. This requires a reducing atmosphere in the furnace. It will be seen from the foregoing description that a furnace constructed according to the invention permits of adjustment to effect recovery not only of sodium carbonate from black liquor resulting from the so-called "soda" process but also sodium sulphide from black liquor resulting from the so-called "sulphate" process. Moreover, the invention lends itself to other metallurgical and chemical operations where burning of a charge is to be conducted in an oxidizing atmosphere or in a reducing atmosphere.

While certain specific embodiments of the invention and certain specific methods have been described in the foregoing, it will be understood that these are primarily illustrative and it will be further understood that various changes or modifications may be made without departing from the spirit of the invention, the scope of which is comprehended by the annexed claims.

What is claimed is:

1. The method of pyrogenetically treating a mixture containing a combustible material and a non-combustible material like waste black liquor from pulp digesters having slag-forming properties which comprises introducing the mixture into a combustion chamber with air, directing said mixture and air toward the interior surface of said chamber and completely burning the combustible part of said mixture prior to the time it reaches said surface whereby the hot molten products resulting from the combustion strikes the interior surface of said chamber freed from said combustible part and by means of a moving liquid coolant, maintaining said surface at a temperature which will cause the slag-forming part of the hot molten products resulting from the combustion to coalesce and solidify on said surface to form thereon a layer of refractory freed from said combustible part and, while transferring heat from said layer to said moving coolant, maintaining said layer of refractory on said surface as additional quantities of said non-combustible hot molten products come in contact with said layer and coalesce thereon.

2. The method of burning a mixture such as black liquor containing a combustible material and a non-combustible material having slag-forming properties which comprises introducing the mixture into a combustion chamber with sufficient air to burn the combustible part, directing the mixture and air toward the interior surface of said chamber and completely burning out the combustible part of said mixture prior to the time the molten products resulting from the combustion strike the interior surface of said chamber whereby the slag-forming part is rendered free of said combustible material and by means of a moving liquid coolant, maintaining said surface at a temperature which will cause the slag-forming part of the molten products resulting from the combustion to coalesce and solidify on said surface to form thereon a layer of refractory free from combustible material and, while transferring heat from said layer to said moving coolant, maintaining said layer of refractory on said surface as additional quantities of said non-combustible molten products come in contact with said layer and coalesce thereon and drawing off excess coalesced non-combustible material in molten state from said chamber.

3. The method of burning black liquor which comprises introducing said black liquor into a combustion chamber in a continuous sprayed stream with air to burn the combustible part of the liquor, directing said stream toward the interior surface of the walls of said chamber and completely burning all of the combustible part of said liquor in said chamber while said stream is traveling toward and prior to the time the hot non-combustible soda products resulting from the combustion reaches the interior surface of said chamber whereby said soda products striking said surface are rendered free of said combustible part, maintaining said surface at a temperature which will coalesce said soda products on said surface by means of moving a cooling liquid, and passing a sufficient amount of said cooling liquid past said surface to cause a sufficient amount of soda to solidify on said surface to form a layer of soda free of combustible to serve as a refractory thereon.

4. The method of recovering soda from black liquor which comprises introducing the black liquor in a substantially continuous stream into a combustion chamber with sufficient air to completely burn the combustible part of the liquor, directing said stream toward the interior surface of the walls of said chamber and burning the combustible part of said liquor in said chamber while said stream is traveling toward and prior to the time it strikes said surface whereby the hot non-combustible soda products resulting from the combustion strikes the interior surface of said chamber in a condition in which it has already had the combustible part burned out, maintaining said surface at a temperature which will coalesce said soda products substantially free of said combustible part on said surface by means of a moving cooling liquid, passing a sufficient amount of said cooling liquid past said surface to cause a sufficient amount of soda to coalesce and solidify on said surface to form thereon a refractory layer substantially free of combustible part, and as additional quantities of molten soda products come in contact with said layer, transferring sufficient heat therefrom to said moving cooling liquid to cause said additional quantities of soda substantially free from said combustible part to coalesce but remain sufficiently molten to be flowed from said chamber while at the same time maintaining said solidified layer to serve as a refractory on said surface.

5. The method of recovering soda from black liquor which comprises centrifugally projecting said black liquor in substantially radial jets from the center of a combustion chamber defined by a cylindrical side wall, bottom and roof, with sufficient air to burn the combustible part of the liquor, directing said jets toward said cylindrical side wall and completely burning the combustible part of said liquor in said chamber during its travel toward said wall whereby the hot non-combustible soda products resulting from the combustion strikes and comes in contact with the interior surface of the cylindrical wall of said chamber free from combustible, maintaining said cylindrical bottom and roof surfaces at a temperature which will coalesce soda products coming in contact with said surfaces by means of moving a cooling liquid, and passing a sufficient amount of said cooling liquid past said surfaces to cause a sufficient amount of soda to coalesce and solidify on said surfaces to form thereon a refractory layer free from combustible, and as additional quantities of hot soda products come in contact with said layer transferring sufficient heat therefrom to said moving cooling liquid to cause said additional quantities of soda free from combustible to coalesce but to remain sufficiently molten to be flowed from said chamber while at the same time maintaining said layer of refractory on said surfaces.

6. The method of generating steam by utilizing the heat from the burning of a mixture such as waste black liquor containing a combustible part and a non-combustible part having slag-forming properties which comprises introducing said mixture in a substantially continuous stream into a combustion chamber with air to burn the combustible part of the mixture, directing said stream toward the interior surfaces of the walls of said chamber and completely burning the combustible part of said mixture in said chamber before it strikes said surfaces whereby the hot molten non-combustible slag-forming products resulting from the combustion strikes the interior surfaces of said chamber substantially free of any combustible, maintaining said surfaces at a temperature which will coalesce the slag-forming products coming in contact with said surfaces by passing water in passageways adjacent said surfaces in amounts which will cause a sufficient amount of heat to be drawn from the products of the combustion to generate steam in the water and also to cause a sufficient amount of the hot slag-forming products resulting from the combustion to coalesce and solidify on said surfaces to form a layer thereon substantially free from combustible to serve as a refractory.

7. The method of generating steam and simultaneously recovering soda from black liquor which comprises introducing said black liquor in a substantially continuous stream into a combustion chamber with sufficient air to burn the combustible part of the liquor, directing said stream toward the interior surfaces of the walls of said chamber and completely burning the combustible part of said liquor in said chamber while said stream is traveling toward and prior to the time it strikes said surfaces whereby the hot non-combustible molten soda products resulting from the combustion strikes the interior surfaces of said chamber in a condition in which it has had the combustible part burned out, maintaining said surfaces at a temperature which will coalesce soda products coming in contact with said surfaces by passing water in conduits adjacent said surfaces in amounts which will cause a sufficient amount of heat to be drawn from the products of the combustion to generate steam in the water and also cause a sufficient amount of molten soda from the products of the combustion to coalesce and solidify on said surfaces to form thereon a refractory layer free from said combustible part, and as additional quantities of hot soda products come in contact with said layer transferring sufficient heat therefrom to said moving cooling liquid to cause said additional quantities of soda to coalesce and remain sufficiently molten to be flowed from said chamber while at the same time maintaining said layer of refractory on said surface and simultaneously generating steam in said water moving in said conduits.

8. The method of generating steam and simultaneously recovering soda from black liquor which comprises introducing said black liquor in a substantially continuous stream into a combustion chamber with sufficient air to burn the combustible part of the liquor, directing said stream toward the interior surfaces of the walls of said chamber and completely burning the combustible part of said liquor in said chamber while it is traveling toward and prior to the time the hot non-combustible soda products resulting from the combustion strikes the interior surfaces of said chamber, maintaining said surfaces at a temperature which will coalesce soda products coming in contact with said surfaces by passing water in conduits adjacent said surfaces in amounts which will cause a sufficient amount of heat to be drawn from the products of the combustion to generate steam in the water and also cause a sufficient amount of soda from the products of the combustion to coalesce and solidify on said surfaces to form a refractory layer thereon substantially free from combustible, and as additional quantities of hot soda products come in contact with said layer transferring sufficient heat therefrom to said moving cooling liquid to cause said additional quantities of molten soda substantially free from combustible to coalesce and remain sufficiently molten to be flowed from said chamber while at the same time maintaining said layer of refractory on said surfaces and simultaneously generating steam in said water moving in said conduits, and flowing excess coalesced soda in molten state from said chamber together with a part of the hot gaseous products of combustion.

9. The method of generating steam and simultaneously recovering soda from black liquor which comprises introducing said black liquor in a substantially continuous stream into a combustion chamber and directing the stream toward the interior surface of its walls with sufficient air to burn the combustible part of the liquor, burning substantially all of the combustible part of said liquor in said chamber prior to the time said stream reaches said wall whereby only the molten non-combustible soda products resulting from the combustion strike the interior surfaces of said chamber, maintaining said surfaces at a temperature which will coalesce said soda products free from combustible matter coming in contact with said surfaces by passing water in conduits adjacent said surfaces in amounts which will cause a sufficient amount of heat to be drawn from the products of the combustion to generate steam in the water and also cause a sufficient amount of soda from the products of the combustion to coalesce and solidify on said surfaces to form a refractory layer free of combustible matter thereon, and as additional quantities of hot soda products come in contact with said layer transferring sufficient heat therefrom to said moving cooling liquid to cause said additional quantities of soda free of combustible matter to coalesce and remain sufficiently molten to be flowed from said chamber while at the same time maintaining said layer of refractory on said surface and simultaneously generating steam in said water moving in said conduits, and drawing molten soda together with hot combustion gases from said chamber and bringing said hot soda into contact with an aqueous liquid to form an aqueous solution of soda.

10. A furnace for burning a mixture containing a combustible and a non-combustible part capable of forming a molten slag-like material which comprises roof, bottom and side walls forming a combustion chamber; a burner within said chamber suspended from said roof including air introducing means and fuel introducing means for charging said mixture by centrifugal force in atomized condition into said combustion chamber for burning, said walls including pipes providing passageways adjacent the interior surface of said combustion chamber through which a fluid coolant may be passed for maintaining said surface below the melting point of said slag-like material and means for forcing said coolant through said passageways, a water cooled chamber under said burner, a post within said chamber supporting said water cooled chamber and water cooled pipes surrounding said post providing means for maintaining thereon a layer of refractory coalesced from said slag-forming material.

11. A furnace for burning black liquor containing combustible and non-combustible soda products which comprises roof, bottom and side walls forming a combustion chamber; a wheel burner within said chamber suspended from said roof including air introducing means and fuel introducing means for charging the black liquor centrifugally in atomized condition into said combustion chamber for burning, said walls including pipes providing passageways adjacent the interior surface of said combustion chamber through which a fluid coolant may be passed for maintaining said surface below the melting point of the soda products resulting from the burning of the black liquor and pumping means for forcing said coolant through said passageways, a water cooled chamber beneath and adjacent said burner, a center post extending upwardly from said bottom wall supporting said water cooled chamber, passageways in said post to carry water to said water cooled chamber, pipe surrounding said post providing passageway for fluid coolant providing means for maintaining thereon a layer of coalesced soda to serve as a refractory.

12. A furnace for burning a mixture containing a combustible and a non-combustible part capable of forming a slag-like material which comprises roof, bottom and side walls forming a combustion chamber; a rotatable burner within said chamber suspended from said roof including air introducing means and fuel introducing means for charging the fuel in atomized condition into said combustion chamber for burning, and means including high pressure coils adjacent the interior surface of said combustion chamber through which water may be passed for maintaining the interior surface of the combustion chamber below the melting point of said slag-like material, a water cooled chamber beneath said burner, a hollow post supporting said water cooled chamber, a high pressure coil surrounding said post for maintaining the exterior surface of said post below the melting point of said slag-like material, and means including a water pump for forcing water through said coils, said water cooled chamber serving to maintain said burner relatively cool.

13. A furnace for burning black liquor containing combustible products extracted from wood and incombustible soda compounds which comprises a roof and walls defining a combustion chamber, means including a wheel burner suspended from said roof for introducing air and said black liquor in atomized condition into said combustion chamber and for causing incombustible molten soda products resulting from the combustion of the black liquor to impinge upon the interior surface of said combustion chamber, pipes providing passageways adjacent said interior surface through which a liquid coolant may be passed to maintain said surface at a temperature below the melting point of the soda compounds resulting from the combustion of the black liquor, a water cooled chamber adjacent the underside of said wheel burner to cool said burner, a hollow center post extending upwardly from said bottom wall providing passageway for air to said burner, a spirally wound pipe surrounding said post providing passageway for said coolant, and a pump connected to said passageways to force said coolant through said passageways.

14. A furnace comprising roof, bottom and side walls defining a combustion chamber, a burner within said chamber supported from above said roof, a substantially flat coil lying under and adjacent said roof through which a liquid coolant may be passed, supporting members above said coil for carrying the weight of the coil, a plurality of supporting lugs secured to said coil, connecting members attaching said lugs to said supporting members, and means in said coil for adjusting the flow of said coolant through said coil, a center post extending upwardly from the bottom of said combustion chamber, a coil surrounding said center post through which a liquid coolant may be passed, spiral coils lying adjacent the said side walls through which a liquid coolant may be passed, a header connecting the head ends of said coils and a header connecting the tail ends of said coils, and means to force coolant through said headers and coils.

15. A furnace comprising roof, bottom and side walls defining a combustion chamber, a burner within said chamber supported from above said roof, a substantially flat coil lying under and adjacent said roof through which a liquid coolant may be passed, supporting members above said coil for carrying the weight of the coil, a plurality of supporting legs secured to said coil, connecting members attaching said lugs to said supporting members, a center post extending upwardly from the bottom of said combustion chamber, a coil surrounding said center post through which a liquid coolant may be passed, spiral coils lying adjacent the said side walls through which a liquid coolant may be passed, a header connecting the head ends of said coils and a header connecting the tail ends of said coils, means to force coolant through said headers and coils, and means including orifice plates for adjusting the amount of coolant forced through the respective coils.

16. A furnace as specified in claim 10 in which the burner includes an atomizing rotor which charges the fuel in atomized condition in a flat ring.

17. A furnace as specified in claim 10 which includes means defining a combustion chamber outlet, a coil lining said outlet through which water may be passed to maintain the interior surface of said outlet at a temperature below the melting point of said slag-like material and means for drawing off slag-like material as a molten mass from said combustion chamber.

18. A furnace as specified in claim 10 in which the pipes which provide passageways adjacent the interior surface of the combustion chamber include a flat coil lying under and adjacent said roof, said coil having secured thereto a plurality of supporting lugs and said furnace including supporting members above said coil to which said lugs are secured, said supporting members carrying the weight of said coil.

19. A furnace as specified in claim 10 in which the burner comprises a rotatable shaft, a sleeve concentric with said shaft, bearings for said shaft mounted in said sleeve, a fuel distributor wheel fixed to said shaft, said distributor wheel having an upper and a lower plate each including air throwing vanes, radially extending fuel throwing channels intermediate said upper and lower plates, said upper plate having a central opening connecting with the inner ends of said channels, a double walled fuel distributor head around said shaft and extending into said central opening and providing an annular fuel charging conduit connecting with said channels and which furnace includes a water jacket above said distributor wheel and walls defining an annular well around said shaft below said bearings to receive lubricating oil delivered to said bearings and an impeller secured to said shaft to rotate in said well to pump oil from said well and return it to said bearings.

20. A furnace as specified in claim 10 in which said burner has a flue and water cooled pipes lining said flue for maintaining thereon a layer of refractory coalesced from said slag forming material and in which said burner comprises a rotatable shaft, a fuel distributor wheel fixed to said shaft, said distributor wheel having an upper and a lower plate each including air throwing vanes, radially extending fuel throwing channels intermediate said upper and lower plates, said upper plate having a central opening connecting with the inner ends of said channels, a double walled fuel distributor head around said shaft and extending into said central opening and providing an annular fuel charging conduit connecting with said channels, said furnace also including a casting secured to said roof and forming a well within which to mount said burner mechanism and a ring through which said shaft extends, said ring being closely but removably fitted into said casting to prevent lateral movement of said burner mechanism.

21. A furnace as specified in claim 10 which includes a draw-off conduit connecting with said combustion chamber through which to draw off coalesced non-combustible material as a molten mass and an exhauster means on the outside of said combustion chamber to withdraw hot combustion gases through said conduit to aid in maintaining the coalesced material molten as it is drawn off through said conduit.

JOHN E. GREENAWALT.

References Cited in the file of this patent
UNITED STATES PATENTS

| Number | Name | Date |
|---|---|---|
| 418,274 | Cloudman | Dec. 31, 1889 |
| 981,217 | Newcomb | Jan. 10, 1911 |
| 1,784,747 | Peckelloff | Dec. 9, 1930 |
| 1,803,067 | Major et al. | Mar. 28, 1931 |
| 1,931,536 | Goodell | Oct. 24, 1933 |
| 2,070,632 | Tomlinson | Feb. 16, 1937 |
| 2,072,587 | Greenwalt | Mar. 2, 1937 |
| 2,139,348 | Badenhausen | Dec. 6, 1938 |
| 2,161,110 | Tomlinson | June 6, 1938 |
| 2,161,111 | Wilcoxson et al. | June 6, 1938 |
| 2,162,105 | Muren | June 13, 1939 |
| 2,170,349 | Bailey | Aug. 22, 1939 |
| 2,191,712 | Greenwalt | Feb. 27, 1940 |
| 2,213,052 | Rosencrants | Aug. 27, 1940 |
| 2,231,872 | Bailey et al. | Feb. 18, 1941 |
| 2,258,467 | Owens | Oct. 7, 1941 |
| 2,261,995 | Greenwalt | Nov. 11, 1941 |
| 2,268,559 | Bailey | Jan. 6, 1942 |
| 2,319,399 | Hamm | May 18, 1943 |
| 2,357,302 | Kerr et al. | Sept. 5, 1944 |
| 2,417,929 | Hanson | Mar. 25, 1947 |